United States Patent
Huang et al.

(10) Patent No.: US 10,391,679 B2
(45) Date of Patent: Aug. 27, 2019

(54) PERFORATED MEMBRANES AND METHODS OF MAKING THE SAME

(71) Applicant: SCHLUMBERGER TECHNOLOGY CORPORATION, Sugar Land, TX (US)

(72) Inventors: Jiangshui Huang, Sugar Land, TX (US); Jose Alberto Ortega Andrade, Houston, TX (US); Bernhard R. Lungwitz, Houston, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 244 days.

(21) Appl. No.: 15/217,145

(22) Filed: Jul. 22, 2016

(65) Prior Publication Data

US 2018/0021984 A1 Jan. 25, 2018

(51) Int. Cl.
*B29C 33/00* (2006.01)
*B29C 33/52* (2006.01)
*B29K 27/18* (2006.01)
*B29K 63/00* (2006.01)
(Continued)

(52) U.S. Cl.
CPC .......... *B29C 33/0033* (2013.01); *B29C 33/52* (2013.01); *B29K 2027/18* (2013.01); *B29K 2063/00* (2013.01); *B29K 2075/00* (2013.01); *B29L 2031/755* (2013.01)

(58) Field of Classification Search
CPC ................. B29C 33/0033; B29C 33/52; B29L 2031/755; B29K 2063/00; B29K 2027/18; B29K 2075/00
See application file for complete search history.

(56) References Cited

U.S. PATENT DOCUMENTS 4,060,497 A 11/1977 Huschka et al.
4,297,308 A * 10/1981 Popplewell ............ A63B 49/10
264/46.6
(Continued)

FOREIGN PATENT DOCUMENTS

WO 2012177625 A1 12/2012
WO 2015077130 A1 5/2015

OTHER PUBLICATIONS

International Search Report and Written Opinion issued in International Patent Appl. No. PCT/US2017/041802 dated Oct. 23, 2017; 12 pages.

(Continued)

*Primary Examiner* — Nahida Sultana
(74) *Attorney, Agent, or Firm* — Andrea Tran

(57) ABSTRACT

A method for forming a perforated membrane includes providing a mold having at least a first set of a plurality of rods extending to at least a first height from a base of the mold, introducing a curable material into the mold in an amount such that a height of the curable material from the base of the mold is less than or equal to the first height so that the first set of the plurality of rods are within the curable material and extend to or past the height of the curable material in the mold, curing the curable material, dissolving the first set of the plurality of rods to thereby form perforations in the cured material and removing the cured material having the perforations from the mold.

16 Claims, 2 Drawing Sheets

(51) Int. Cl.
*B29K 75/00* (2006.01)
*B29L 31/00* (2006.01)

(56) References Cited

U.S. PATENT DOCUMENTS

| | | | | |
|---|---|---|---|---|
| 4,576,568 A * | 3/1986 | Grannen, III | ....... | B29C 33/0033 |
| | | | | 249/64 |
| 5,368,467 A * | 11/1994 | Kleyn | ................ | B29C 33/0033 |
| | | | | 249/178 |
| 5,500,162 A | 3/1996 | Theisen et al. | | |
| 5,725,044 A * | 3/1998 | Hirokawa | .............. | B22D 15/02 |
| | | | | 164/131 |
| 5,798,073 A * | 8/1998 | Johnson | .............. | B29C 33/0033 |
| | | | | 249/154 |
| 5,980,809 A * | 11/1999 | Crain | ................. | B29C 45/2628 |
| | | | | 249/64 |
| 6,197,073 B1 | 3/2001 | Kadner et al. | | |
| 8,657,002 B2 | 2/2014 | Willberg et al. | | |
| 8,883,693 B2 | 11/2014 | Eldred et al. | | |
| 2006/0016598 A1 | 1/2006 | Urbanek | | |
| 2008/0241540 A1 | 10/2008 | Canova et al. | | |
| 2012/0205836 A1* | 8/2012 | Chen | .................... | B29C 33/302 |
| | | | | 264/328.1 |
| 2013/0071615 A1 | 3/2013 | Murata et al. | | |

OTHER PUBLICATIONS

International Preliminary Report on Patentability issued in International Patent Appl. No. PCT/US2017/041802 dated Jan. 31, 2019; 9 pages.

\* cited by examiner

PERFORATED MEMBRANES AND METHODS OF MAKING THE SAME

BACKGROUND

Hydrocarbons (such as oil, condensate, and gas) may be produced from wells that are drilled into formations containing them. For a variety of reasons, such as low permeability of the reservoirs or damage to the formation caused by drilling and completion of the well, or other reasons resulting in low conductivity of the hydrocarbons to the well, the flow of hydrocarbons into the well may be undesirably low. In this case, the well is "stimulated," for example, using hydraulic fracturing, chemical (such as an acid) stimulation, or a combination of the two (often referred to as acid fracturing or fracture acidizing).

Hydraulic and acid fracturing treatments may include two stages. A first stage comprises pumping a viscous fluid, called a pad, which is typically free of proppants, into the formation at a rate and pressure high enough to break down the formation to create fracture(s) therein. In a subsequent second stage, a proppant-laden slurry is pumped into the formation in order to transport proppant into the fracture(s) created in the first stage. In "acid" fracturing, the second stage fluid may contain an acid or other chemical, such as a chelating agent, that can assist in dissolving part of the rock, causing irregular etching of the fracture face and removal of some of the mineral matter, which results in the fracture not completely closing when the pumping is stopped. Occasionally, hydraulic fracturing may be done without a highly viscosified fluid (such as water) to minimize the damage caused by polymers or the cost of other viscosifiers. After finishing pumping, the fracture closes onto the proppant, which keeps the fracture open for the formation fluid (e.g., hydrocarbons) to flow to the wellbore of the well.

Proppant is typically made of materials such as sand, glass beads, ceramic beads, or other materials. Sand is used frequently as the proppant for fracture treatments. However, for fractures with high closure stress, such as greater than 6,000 pound per square inch (psi), in deep wells or wells with high formation forces, higher strength proppant is desired. The closure stress that sand can sustain is normally about 6,000 psi, so a closure stress over 6,000 psi could crush the sand into fine particles and collapse the sand pack, which results in insufficient conductivity for the formation fluid to flow to the wellbore. Furthermore, the fine particles may continually flow back during production of the well, and thus the conductivity of the well would reduce further, which results in a short useful life of the well or results in a need for costly refracturing of the well.

Ceramic proppant has been used to maintain the conductivity of the wells with a high closure stress. Typically, the higher the alumina ($Al_2O_3$) content, the higher the hardness and toughness of the ceramic proppant, but also the higher the specific gravity. A high specific gravity may lead to quick gravitational settling of the proppant, which results in difficulty to transport the proppant into the fracture, especially for locations far from the wellbore. Also, quick settling in the fracture leads to lack of proppant on the top part of a fracture, which reduces the productivity of the well. To transport proppant of high specific gravity with fracturing fluid of a low viscosity, fiber can be added to the fluid as an additive. See, for example, U.S. Pat. No. 8,657,002, incorporated herein by reference in its entirety. To use fiber effectively for transporting proppant, the interaction force between fiber and proppant is to be considered.

The so-called drip-casting manufacturing technique has been adapted for the manufacture of spherical ceramic proppants. Drip-casting substitutes conventional ways of pelletizing (also called granulating) ceramic proppant such as using high intensity mixers and pan granulators. Vibration-induced dripping (or drip-casting) was first developed to produce nuclear fuel pellets. See U.S. Pat. No. 4,060,497. It has subsequently evolved into applications for metal and ceramic microspheres for grinding media, pharmaceuticals and food industry. An application of vibration-induced dripping to aluminum oxide spheres is described in U.S. Pat. No. 5,500,162. The production of the microspheres is achieved through vibration-provoked dripping of a chemical solution through a nozzle. The falling drops are surrounded by a reaction gas, which causes the droplet to gel prior to entering the reaction liquid (to further gel). Using a similar approach, U.S. Pat. No. 6,197,073 covers the production of aluminum oxide beads by flowing a sol or suspension of aluminum oxide through a vibrating nozzle plate to form droplets that are pre-solidified with gaseous ammonia before their drop into ammonia solution.

U.S. Patent Application Publication No. 2006/0016598 describes the drip-casting to manufacture a high-strength, light-weight ceramic proppant. U.S. Pat. No. 8,883,693 describes the application of the drip-casting process to make ceramic proppant, with a slurry being ejected through one or more nozzles.

WO 2015/077130, incorporated herein by reference in its entirety, describes methods and apparatus for forming proppant particles, which includes providing an aqueous slurry of ceramic forming raw materials, flowing the slurry through a perforated membrane, which may be energized, to form slurry bodies, receiving the slurry bodies in a collecting hopper, and drying the slurry bodies to form particles. In some aspects, the slurry is energized as it flows through the perforated membrane. See the Abstract.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

What is still desired is a convenient and cost effective method of forming perforated membranes that may be used in a proppant manufacturing apparatus in order to form ceramic particles of consistent size and reliable quality, which ceramic particles are able to perform well in downhole applications in fracture formation, for example as a proppant and/or as an anti-flowback additive.

Described herein is a method for forming a perforated membrane comprising: providing a mold having at least a first set of a plurality of rods extending to at least a first height from a base of the mold; introducing a curable material into the mold in an amount such that a height of the curable material from the base of the mold is less than or equal to the first height so that the first set of the plurality of rods are within the curable material and extend to or past the height of the curable material in the mold; curing the curable material; dissolving the first set of the plurality of rods to thereby form perforations in the cured material; and removing the cured material having the perforations from the mold.

Also described herein is a method comprising: forming a perforated membrane by providing a mold having at least a first set of a plurality of rods extending to at least a first height from a base of the mold, introducing a curable material into the mold in an amount such that a height of the curable material from the base of the mold is less than or equal to the first height so that the first set of the plurality of rods are within the curable material and extend to or past the height of the curable material in the mold, curing the curable material, dissolving the first set of the plurality of rods to thereby form perforations in the cured material; and removing the cured material having the perforations from the mold; and inserting the formed perforated membrane into a proppant manufacturing apparatus comprising a housing for a slurry comprised of particles and reactant, a mechanism for inducing flow of the slurry from the housing to a forming section that comprises the perforated membrane, and a container for providing a coagulation solution.

Also described are perforated membranes formed by the methods described herein, and particles formed using the perforated membranes in a proppant manufacturing apparatus.

DETAILED DESCRIPTION

Figure 1:
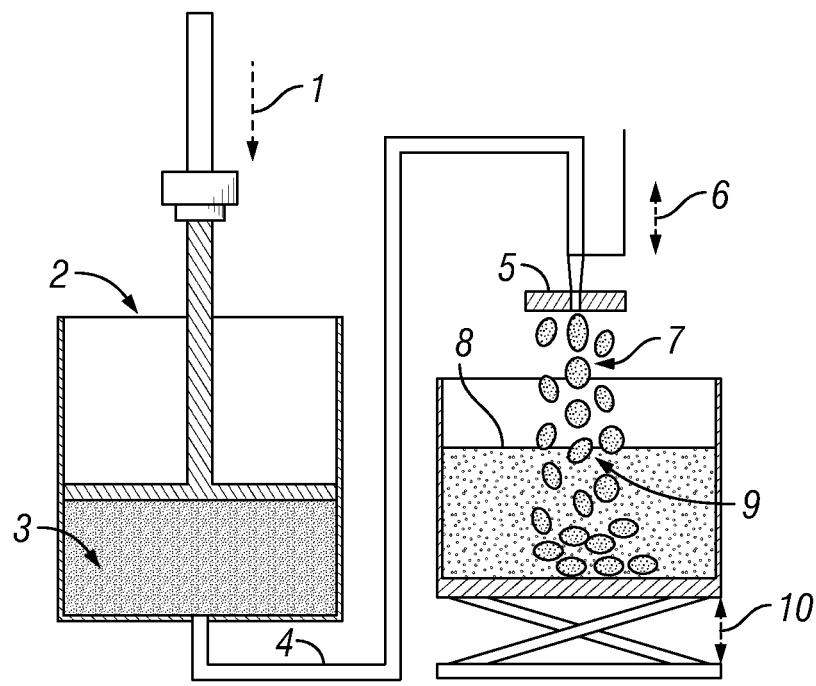
FIG. 1 is a schematic of an example apparatus for forming particles using a proppant manufacturing apparatus.

In the following description, numerous details are set forth to provide an understanding of the present disclosure. However, it may be understood by those skilled in the art that the methods of the present disclosure may be practiced without these details and that numerous variations or modifications from the described embodiments may be possible.

At the outset, it should be noted that in the development of any such actual embodiment, numerous implementation-specific decisions may be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure. In addition, the composition used/disclosed herein can also comprise some components other than those cited. In the summary and this detailed description, each numerical value should be read once as modified by the term "about" (unless already expressly so modified), and then read again as not so modified unless otherwise indicated in context. The term about should be understood as any amount or range within 10% of the recited amount or range (for example, a range from about 1 to about 10 encompasses a range from 0.9 to 11). Also, in the summary and this detailed description, it should be understood that a range listed or described as being useful, suitable, or the like, is intended to include support for any conceivable sub-range within the range at least because every point within the range, including the end points, is to be considered as having been stated. For example, "a range of from 1 to 10" is to be read as indicating each possible number along the continuum between about 1 and about 10. Furthermore, one or more of the data points in the present examples may be combined together, or may be combined with one of the data points in the specification to create a range, and thus include each possible value or number within this range. Thus, (1) even if numerous specific data points within the range are explicitly identified, (2) even if reference is made to a few specific data points within the range, or (3) even when no data points within the range are explicitly identified, it is to be understood (i) that the inventors appreciate and understand that any conceivable data point within the range is to be considered to have been specified, and (ii) that the inventors possessed knowledge of the entire range, each conceivable sub-range within the range, and each conceivable point within the range. Furthermore, the subject matter of this application illustratively disclosed herein suitably may be practiced in the absence of any element(s) that are not specifically disclosed herein.

Unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of concepts according to the disclosure. This description should be read to include one or at least one and the singular also includes the plural unless otherwise stated.

The terminology and phraseology used herein is for descriptive purposes and should not be construed as limiting in scope. Language such as "including," "comprising," "having," "containing," or "involving," and variations thereof, is intended to be broad and encompass the subject matter listed thereafter, equivalents, and additional subject matter not recited.

Also, as used herein any references to "one embodiment" or "an embodiment" means that a particular element, feature, structure, or characteristic described in connection with the embodiment is included in at least one embodiment. The appearances of the phrase "in one embodiment" in various places in the specification are not necessarily referring to the same embodiment.

The present disclosure relates to methods of making perforated membranes, to a proppant manufacturing apparatus including such perforated membranes, and to methods of making slurry bodies using the proppant manufacturing apparatus that includes the perforated membrane.

The perforated membranes described herein may find uses in any number of devices, for example including in extruders, proppant manufacturing apparatuses such as drip casting devices or drop tower devices, and the like. FIG. 1 is a schematic of an example proppant manufacturing apparatus, for example such as a drip casting device or a drop tower device. In FIG. 1, a slurry 3, for example comprised of a particle forming material such as ceramic particles and a reactant, is housed in container 2. The slurry is induced to flow from the housing, for example by applying a load 1 on a piston. When the load is applied to the slurry, the slurry is made to flow out an exit port of the container 2 and into tube or pipe 4 having an exit that is associated with a perforated membrane 5. In this case, the perforated membrane is located above a coagulation solution 8, such that the slurry exits the perforated membrane as individual slurry bodies 7, which are coagulated into particles 9 through interaction of the reactant of the slurry with the coagulation solution. Also shown in FIG. 1 is the option for the perforated membrane to be vertically vibrated (labeled 6) in order to break the slurry bodies into smaller sized bodies, and the option for the coagulation solution to be moved up or down (labeled 10) in relation to the perforated membrane location.

Figure 2:
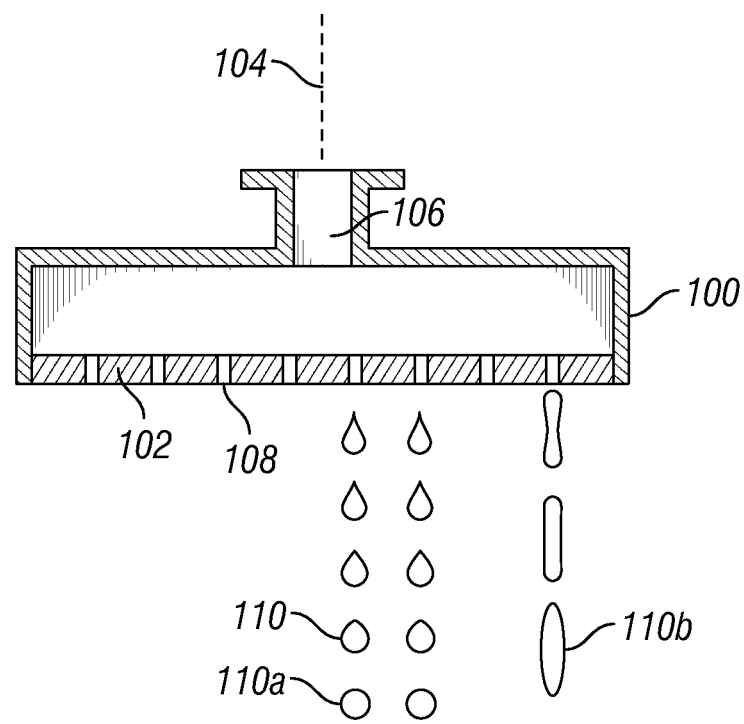
FIG. 2 illustrates an example perforated membrane.

FIG. 2 illustrates an example of a perforated membrane in more detail. As shown in FIG. 2, perforated membrane 102 may be supported or mounted in the proppant manufacturing apparatus via a housing 100. The housing receives the slurry at point 104 through one or more openings 106, and the slurry is then fed through the perforated membrane 102. The slurry may then be emitted, or otherwise discharged, from one or more perforations 108 (eight shown) forming slurry bodies 110. Depending on slurry rheology, slurry flow rate, optional mechanical or vibrational energy applied to the perforated membrane as the slurry exits therethrough, perforation shape and/or other suitable properties and conditions, the slurry may exit the perforations in various shapes and forms. For example, the slurry may exit the perforations as substantially spherical slurry bodies 110a, cylindrical slurry bodies 110b, for example where the perforated membrane is located above the coagulation solution, or other resulting output shaped slurry bodies such as continuous rods, for example where the perforated membrane is immersed in the coagulation solution. Conditions and properties forming slurry body shapes are within the scope of this disclosure. The shaped slurry exiting the perforations of the perforated membrane can fall by gravity, mist and/or air transportation, vertically or horizontally, through and/or into a coagulation solution.

A proppant manufacturing apparatus as described herein thus includes a proppant manufacturing apparatus comprising a housing for a slurry comprised of particles and reactant, a mechanism for inducing flow of the slurry from the housing to a forming section that comprises the perforated membrane, and a container for providing the coagulation solution. The container may be a container holding the coagulation solution and into which the slurry drops or enters as it exits the perforated membrane.

In some embodiments of the disclosure, perforation(s) 108 terminate at the outer surface of the membrane, and as such, are substantially flush therewith.

Methods of making the perforated membrane will first be described.

Perforated membranes used in proppant manufacturing apparatuses have been typically made by drilling holes on an aluminum alloy slab. The perforation size can be as small as 0.1 mm diameter. However, the error in diameter induced by drilling can be rather significant. In addition, due to the nature of drilling, some perforations are not very round, which can lead to clogging of the perforations and inconsistency in the shapes and sizes of particles formed through the perforated membrane.

Figure 3:
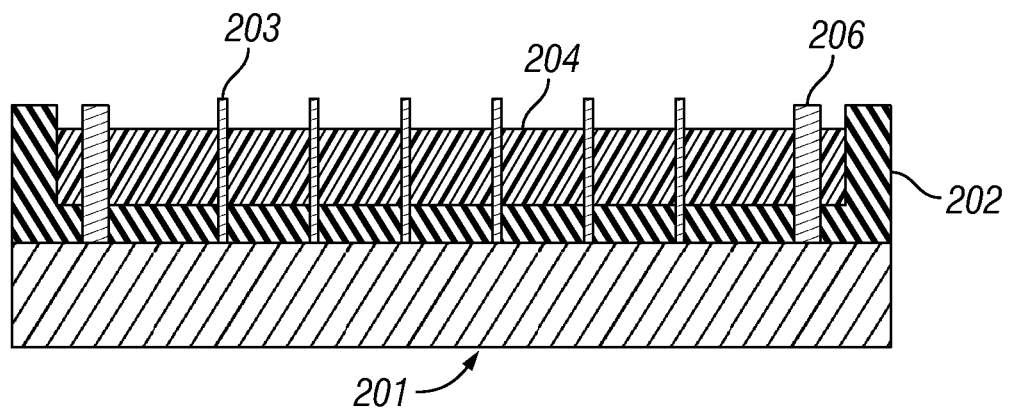
FIG. 3 illustrates a mold for forming a perforated membrane.

Herein, rather than using drilling to form perforations in the perforated membrane, a molding technique is used. One example for forming a perforated membrane through molding is illustrated in FIG. 3. In the method for forming a perforated membrane comprising, a mold comprised of a substrate 201 and a membrane shaped form 202 is provided. At least a first set of a plurality of rods 203 are made to extend from a base of the mold, for example from a surface of the substrate or from a surface of the membrane shaped form, to at least a height such that the rods will extend at least to, and desirably greater than, a height of the curable material 204 once filled into the mold. As the curable material will be filled to a height of, for example, 1 mm to 30 mm, such as 3 mm to 10 mm, from the bottom of the mold, which height corresponds to an end thickness of the perforated membrane, the rods should extend to a height that is at least the same as, and desirably more than, this height. This first set of rods ultimately form the perforations of the perforated membrane through which the slurry is made to flow when the perforated membrane is in the proppant manufacturing apparatus. The rods may be comprised of any suitable material, such as plastics, ceramics, metals, for example steel, and the like. The rods are desirably comprised of a material that can be later removed by dissolution without damage or dissolution to the cured material making up the perforated membrane, as will be discussed. In this regard, the rods are comprised of a metal such as steel.

The rods of the first set of rods may have a diameter of from 0.3 mm to 8 mm, for example, from 0.4 mm to 5 mm. The rods may have any suitable cross-sectional shape, for example round, to impart a desirable shape to the perforations of the perforated membrane. For example, the perforations in the membrane may be shaped to achieve optimum flow properties, and can include cylindrical, conical, hourglass, double-conical, concave, convex, or with rounded walls, but not necessarily limited thereto.

As shown in FIG. 3, the mold may also have a second set of rods 206 extending from a base of the mold in a same manner as the first set of rods. The second set of rods typically have a diameter that is larger than a diameter of the exit side opening of the perforations from the first set of rods, but this is not necessary. The second set of rods may be formed of the same materials as the first set of rods. The second set of rods are used to form mounting holes in the perforated membrane, for example holes that may be used to mount the membrane in the proppant manufacturing apparatus.

One method for providing the mold may be to first fix the first set of rods to extend perpendicularly from the surface of the substrate, which substrate may be comprised of any suitable material such as metal, plastic or wood. Thereafter, the membrane shaped form may be formed on the substrate such that the form encompasses and surrounds the first and second set of rods, with the sets of rods still extending a height that is at least the same as, and desirably is greater than, a height to which the curable membrane material will be when introduced into the mold. The membrane shaped form is upon a surface of the substrate, has perimeter wall portions extending beyond a height to which the curable membrane forming material will be when introduced into the form, and has a size and shape corresponding to the size and shape of the end membrane. The membrane shaped form may be formed of a flexible material with low surface energy, for example flexible so that the mold can be deformed to allow for removal, or peeling off, of the perforated membrane and of low surface energy so that the curable material of the perforated membrane has a lower likelihood of sticking to the mold, thereby making removal from the mold easier. The material may be, for example and without limitation, a silicone material such as polydimethylsiloxane (PDMS) and silicone rubber. The form may be shaped on the substrate, for example by curing the material by crosslinking with the use of a crosslinking or curing agent.

A curable material 204 for forming the perforated membrane is then introduced into the mold in an amount such that a height of the curable material from the base of the mold is less than, or at most equal to, the height of the rods extending from the mold, so that the first set, and also the second set if present, of the plurality of rods are within the curable material and extend to or past the height of the curable material in the mold.

As the curable material, any suitable material may be used, such as a plastic, for example a polyurethane, polyester, polyethylene terephthalate (PET), polyethylene, polyvinyl chloride, polyvinylidene chloride, polypropylene, polystyrene, polyamides, acrylonitrile butadiene styrene, polystyrene, epoxy, polytetrafluoroethylene and the like, but not necessarily limited thereto.

Once the mold is filled to the appropriate volume with the curable material, the curable material is cured in any suitable manner, for example through the use of an activating curing agent, heating curing, radiation curing and the like.

Following the curing of the curable material, the rods in the cured material are then removed. Any suitable removal method may be used that does not damage the resulting perforations formed by the removal. An example removal method is through the use of dissolution, for example by exposing the cured material and rods to a dissolving material, and allowing the rods to dissolve. The dissolving material is any material that dissolves the material of the rods without dissolving the cured material. For example, where the rods are comprised of a metal such as steel and the cured material is a polyurethane, the dissolving agent may be any acid that dissolves the steel. As an example, the steel can be dissolved by dipping the entire mold in 40% sulfuric acid or 10% hydrochloride acid.

Once the rods have been removed from the cured material, the cured material is removed from the mold. The resulting perforated membrane may be washed and/or cleaned before use. Because the material of the membrane is plastic, which is lighter than an aluminum or aluminum alloy, the weight of structure can be reduced, which in turn may decrease the energy consumption requirements on the proppant manufacturing apparatus in use, particularly where the proppant manufacturing apparatus is intended to be vibrated in forming the particles.

Prior to use, in embodiments the formed perforated membrane may be subjected to further processing such as forming a hydrophobic coating on a surface of the perforated membrane from which the slurry will be emitted. The hydrophobic coating can assist in avoiding the slurry wetting the surface of the membrane around the perforations as it exits the membrane. Excess slurry on the membrane exit surface, and around the perforations, exerts additional forces on the slurry jet, resulting in an increase in the diameter of the slurry jet and the size of the slurry bodies. This may result in inconsistently sized and shaped slurry bodies exiting the perforated membrane. Application of a hydrophobic coating to the membrane's exit side surface can prevent this wetting phenomenon. Slurry bodies formed through a perforated membrane having an exit surface coated with a hydrophobic coating shows a more favorable creation pattern when the coating was applied to the exit surface. Also, the design on the hydrophobic coating is helpful to decrease the slurry body size, so small proppant sizes can be achieved with bigger perforation sizes compared to the non-treated surface case. It is also helpful to achieve proppant with uniform size.

As the hydrophobic coating material, any suitable material may be used, for example, polyethylene terephthalate (PET), manganese oxide polystyrene ($MnO_2$/PS) nano-composite, zinc oxide polystyrene (ZnO/PS) nano-composite, precipitated calcium carbonate, carbon nano-tube structures, and silica nano-coating.

The hydrophobic coating may be applied to the surface of the perforated membrane in any manner that coats the surface without altering, blocking or clogging the perforations. This may be done by, for example, prior to the dissolving of the rods, coating a surface of the cured material with the hydrophobic material. In this case, the hydrophobic material should be able to withstand the removal treatment, for example the dissolution, that removes the rods.

Figure 4A:
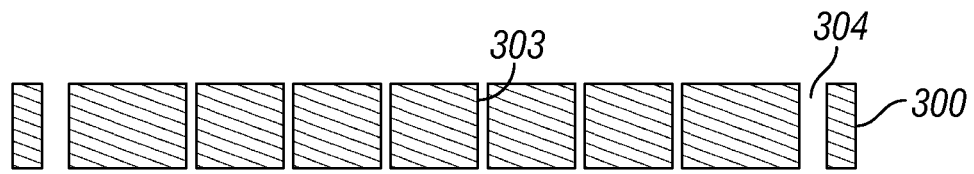
FIGS. 4A-4D illustrate a method for forming a hydrophobic coating on a perforated membrane.
Figure 4B:
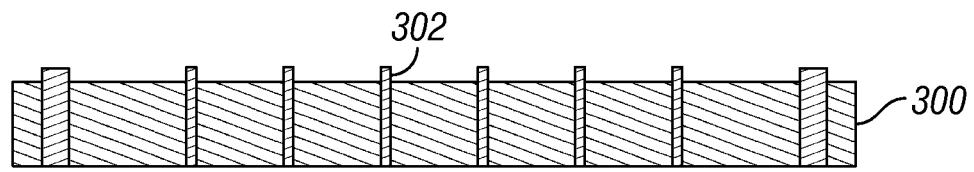
Figure 4C:
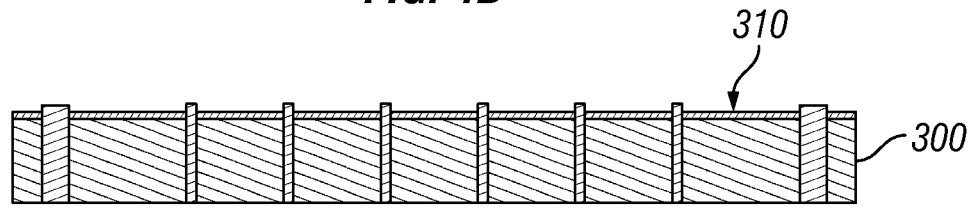
Figure 4D:
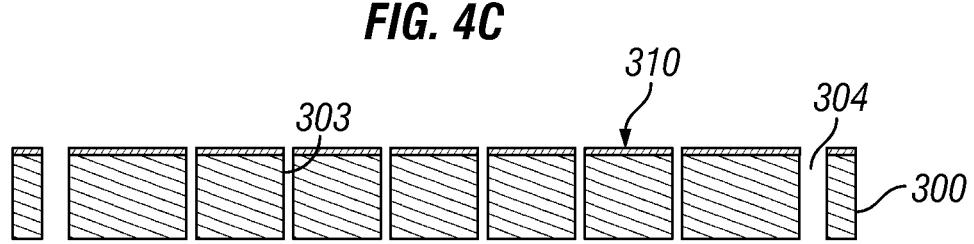

In embodiments, the hydrophobic coating may be applied as illustrated in FIGS. 4A-4D. This method may be performed after the dissolving of the rods but before or after the removing of the cured material from the mold. As shown in FIGS. 4A-4D, to the perforated membrane 300 of FIG. 4A, rods 302 of any material are reinserted into the perforations 303 and openings 304 formed by the first set and second set of rods, as shown in FIG. 4B. The hydrophobic coating 310 is then applied to the surface of the perforated membrane as shown in FIG. 4C. The rods are then subsequently removed, for example by physical removal or by other methods such as dissolution, as shown in FIG. 4D, resulting in a perforated membrane having a slurry exit surface coated with a hydrophobic coating.

In the above methods, the hydrophobic coating may be applied by any suitable technique, including without limitation spray coating or flood coating. The thickness of the hydrophobic coating may be from 10 nanometers to 100 micrometers, for example, from 1 micrometer to 50 micrometers.

Once formed, the perforated membrane is then inserted into the proppant manufacturing apparatus. This may be done by mounting the perforated membrane in the device by attachment means such as screws or bolts through the openings formed by the second set of rods. The perforated membrane may be included in any suitable proppant manufacturing apparatus, for example including any of the devices described in WO 2015/077130, which is incorporated herein by reference.

In an embodiment, the perforations have a shape in which the membrane has a height (thickness) H, a larger diameter opening at a slurry entrance side of the membrane and a smaller diameter opening at a slurry exit side of the membrane, with the larger diameter being tapered to the smaller diameter within the thickness of the membrane. For example, the smaller diameter opening, which is the desired size of the perforation as the slurry exits the perforated membrane, extends into the perforated membrane at approximately that diameter for a depth of h, which may be from about 1% to about 70%, for example from about 5% to about 50% or about 5% to about 30%, of the thickness H of the membrane. Likewise, the larger diameter opening extends into the perforated membrane at approximately that diameter for a depth that may be from about 5% to about 70%, for example from about 5% to about 50%, of the thickness H of the membrane. The larger diameter desirably tapers to the smaller diameter in a direction of the flow of the slurry. The foregoing perforation shape may mitigate any plugging potential from the slurry as it flows through the perforations. The foregoing perforation shape may be formed in any suitable manner. For example, the first set of the plurality of rods may be shaped and positioned in the mold to impart the indicated shape. Alternatively, the first set of rods may have a uniformly sized diameter, and then following removal, the openings on the slurry entry side of the membrane may be enlarged by, for example, drilling or etching, wherein the drilling or etching extends the wider diameter to a desired depth into the cured material.

The foregoing perforation configuration may not only decrease the possibility of plugging, it may also decrease the pressure required to run the slurry through the perforation. The pressure associated with the friction at the perforation due to flow is inversely proportional to the perforation diameter. This could reduce the thickness of perforation membrane for surviving the pressure, and thus reduce the weight of the proppant manufacturing apparatus head.

The benefits and advantages of the perforated membranes described herein include the ability to form substantially uniform perforation sizes and high roundness, which can yield slurry bodies having a uniform shape and narrow size distribution. Further, the membranes allow for designs having a low plugging potential with the membrane, the option for hydrophobic surfaces that may enhance slurry deliverability, a light weight membrane structure, a low flowing pressure while running the slurry through the perforations of FIG. 5, and the easy generation of different shaped perforation orifices.

The perforated membranes described herein are desirably used in a proppant manufacturing apparatus in order to form particles that are suitable for use in downhole applications, for example as proppants or anti-flowback additives. The particles may be included in a treatment fluid in order to be transported downhole.

While in embodiments the formed slurry bodies (for example, particles) formed using the proppant manufacturing apparatus and perforated membrane are used in the context of a treatment fluid, for example as a proppant material and/or anti-flowback additive, it is not intended that the particles as described herein be limited to being proppants and/or anti-flowback additives in such treatment fluids.

As used herein, the term "treatment fluid" refers to any pumpable and/or flowable fluid used in a subterranean operation in conjunction with a desired function and/or for a desired purpose. In some embodiments, the pumpable and/or flowable treatment fluid may have any suitable viscosity, such as a viscosity of from about 1 cP to about 10,000 cP, such as from about 10 cP to about 1000 cP, or from about 10 cP to about 100 cP, at the treating temperature, which may range from a surface temperature to a bottom-hole static (reservoir) temperature, such as from about 0° C. to about 150° C., or from about 10° C. to about 120° C., or from about 25° C. to about 100° C., and a shear rate (for the definition of shear rate reference is made to, for mple, Introduction to Rheology, Barnes, H.; Hutton, J. F; Walters, K. Elsevier, 1989, the disclosure of which is herein incorporated by reference in its entirety) in a range of from about 1 $s^{-1}$ to about 1000 $s^{-1}$, such as a shear rate in a range of from about 100 $s^{-1}$ to about 1000 $s^{-1}$, or a shear rate in a range of from about 50 $s^{-1}$ to about 500 $s^{-1}$ as measured by common methods, such as those described in textbooks on rheology, including, for example, Rheology: Principles, Measurements and Applications, Macosko, C. W., VCH Publishers, Inc. 1994, the disclosure of which is herein incorporated by reference in its entirety.

As used herein, the term "particle" as used in the context of the form of the end slurry bodies refers to a particle of any size or shape, including discrete particles of various diameter and length, including spherical particles, cylindrical particles and ovular particles, and continuous rod-shaped particles, which are particles having a geometrically shaped cross-section and dimensions in which a length of the particles is greater than a cross-sectional width of the particles, with "continuous" referring to an unbroken desired length of the slurry in rod form. The length to width/diameter ratio may be at least 2:1.

The method of forming the particles using the proppant manufacturing apparatus and perforated membrane includes forming slurry bodies by inducing flow of a slurry comprised of particles and a reactant through the perforated membrane and into a coagulation solution, wherein the slurry bodies exiting the perforated membrane have an initial desired shape and size. Upon exposure to the coagulation solution, the slurry bodies are stabilized in the initial size and shape by at least partially coagulating the reactant of the slurry in the coagulation solution to form stabilized particles.

In embodiments, the slurry of particles and reactant is formed by mixing. As the particles, the particles may be made of any suitable material, such as, for example, ceramic materials, sand, non-ceramic materials, composites of ceramic reinforced with additional stronger materials and the like. As the ceramic particles of the slurry, any suitable ceramic material may be used, for example glass, and ceramic oxides such as alumina, bauxite, aluminum hydroxide, pseudo boehmite, kaolin, kaolinite, silica, silicates, clay, talc, magnesia and mullite. The ceramic particles may include alumina-containing particles or magnesium-containing particles. The ceramic particles may also be a composite particle that is comprised of ceramic reinforced with higher strength materials, which may be ceramic or non-ceramic, for example such as titanium carbide, carbon nanotubes or reinforcement elements such as fibers or polymers. Where the end particles may be used as a proppant that may need to withstand a higher fracture closure stress, for example of 6,000 psi or more, alumina-containing particles are desired because particles derived from alumina-containing particles have a higher strength and toughness. Typically, the higher the alumina ($Al_2O_3$) content, the higher the strength, hardness and toughness of the end particles. In embodiments, the ceramic particles may have an alumina content of from, for example, 5% to 95% by weight alumina, such as 20% to 75% by weight or 30% to 75% by weight.

While the starting particles for use in the slurry may have any suitable size, an average size of less than 500 microns, such as an average size of 0.01 to 100 microns or 0.01 to 50 microns, may be desirable. The particles (that is, the raw material for the end particles) are desirably sized depending on the perforation diameter through which the slurry will pass in forming the end shaped particles, and the perforation diameter may be equal to or greater than, for example, ten times the raw material particle average diameter.

The reactant in the slurry may be any material that can be coagulated, gelled and/or cross-linked by another material that is present in the coagulation solution. Reactants are typically organic materials used to stabilize the shape of the slurry once it is formed into the desired particle shape. The reactants thus react to form a solid or semi-solid shaped product once exposed to the coagulation solution. Examples of suitable reactants include, for example, polyvinyl alcohol, polyvinyl acetate, methylcellulose, dextrin, polysaccharides such as alginates, for example sodium alginate, and molasses. Sodium alginate is a naturally occurring polysaccharide that is soluble in water as the sodium salt, and is a suitable reactant in the methods described herein. The reactant may be included in the slurry in an amount of from 0.01% to 25%, such as 0.01% to 5% or 0.01% to 1% by weight of the slurry. The solids content of the slurry may be from, for example, 10% to 95%, such as 15% to 90% or 20% to 90%. The solids content may be adjusted so that the slurry has a suitable viscosity for flow through the one or more orifices, such as a viscosity of 1 to 10,000 cP measured at a shear rate of 100 (1/s).

The slurry may also contain one or more solvents. Possible solvents that can be used include water, alcohols, and ketones. Other additives may also be included in the slurry, such as lubricants and dispersants. Lubricants may include one or more of Manhattan fish oil, wax emulsions, ammonium stearates, and wax. Dispersants may include one or more of a colloid, polyelectrolyte, tetra sodium pyrophosphate, tetra potassium pyrophosphate, polyphosphate, ammonium citrate, ferric ammonium citrate, hexametaphosphate, sodium silicate, ammonium polyacrylate, sodium polymethacrylate, sodium citrate, sodium polysulfonate or hexametaphosphate salt, as well as any surfactant.

The slurry may be housed in a container. The slurry is induced to flow from the container to the perforated membrane by any suitable method. For example, the slurry may be induced to flow from the container by applying a load to a piston in the container housing the slurry to force the slurry out an exit port of the container that is associated with the perforated membrane. Also, increasing pressure in the container housing the slurry by any suitable method, and/or decreasing a volume of the container housing the slurry by any suitable method, to force the slurry to exit the container at a port associated with the perforated membrane may also be used. The slurry may also be pumped from the container housing the slurry to the perforated membrane associated with an exit of the container.

The exit port of the container may be connected to a pipe through which the slurry flows to the perforated membrane. Alternatively, the exit port may directly feed the slurry to the perforated membrane.

The perforations of the perforated membrane may be used to impart a cross-sectional shape to the particles in embodiments in which the perforated membrane is immersed in the coagulation solution. For example, the perforated membrane may have a shape such as circle, ellipse, oval, quatrefoil, triangle, rectangle and the like. As the slurry is flowed through the perforated membrane and exits directly into the coagulation solution, the shape of the orifice will be imparted to the slurry such that the continuous slurry bodies exiting the perforated membrane will have a corresponding cross-sectional shape. In this manner, the slurry bodies can be made to have a cross-sectional shape such as circle, ellipse, oval, quatrefoil, triangle, rectangle and the like.

In addition, in embodiments where the perforated membrane is immersed in the coagulation solution, a vibration may be applied to the perforated membrane as the slurry flows through the perforations in order to impart an inhomogeneous cross-section along the length of the formed continuous slurry bodies. For example, vibrating the orifices by a mechanical means during flowing of the slurry, where the vibration frequency is maintained to a low enough frequency to avoid completely severing the flow, that is, without breaking a continuous flow into separate segments, can alter the cross-section of the continuous slurry bodies along the length thereof. As an example, the vibration can be intermittently applied to thin or thicken (make smaller or bigger) the cross-sectional diameter at points along the length of the continuous slurry body. When the perforated membrane moves in the same direction of the slurry flow, the cross-section will become thicker, and when the perforated membrane moves in the opposite direction of the slurry flow, the cross-section will become thinner. A suitable range of frequencies for the vibration to thin or thicken the cross-section is, for example, 0.01-100 Hz, as long as the slurry flow is not severed. In addition to the frequency, the vibration amplitude, slurry composition, flow speed and perforation size may also be taken into consideration in determining the frequency of the vibration to be applied.

The perforated membrane may be located above the coagulation solution, or may be immersed in the coagulation solution. The perforated membrane may be moved in a vertical direction with respect to the surface of the coagulation solution. In this manner, the perforated membrane may be located above the coagulation solution during the flowing of the slurry therethrough, or may be located in, or immersed in, the coagulation solution. When the perforated membrane is above the coagulation solution, the slurry bodies exit the membrane as discrete slurry bodies, for example having a spherical, cylindrical or ovular shape. When the perforated membrane is immersed in the coagulation solution, the slurry bodies exit the membrane as continuous rods. In still further embodiments, the orifices may be made to move in a horizontal manner, or laterally, with respect to a surface of the coagulation solution while the slurry is flowing therethrough. This may allow for a continuous uninterrupted stream to be organized, or aligned, within the coagulation solution.

To achieve continuous slurry bodies of a desired length when the perforated membrane is immersed in the coagulation solution, a periodic spike vibration may be applied to the perforated membrane when an amount of slurry that has passed through the perforated membrane is such that the slurry having exited through the perforated membrane has a predetermined length. Whereas above a low vibration frequency was possibly applied to thin but not sever a continuous flow, here the periodic spike vibration is sufficient to sever the flow as it passes through the perforated membrane. Alternative means may also be used to sever the flow as it exits the perforated membrane, for example with the use of cutters such as a rotating disk or knife.

The slurry may be flowed through the perforated membrane at such a rate that the slurry is maintained in a continuous uninterrupted state as it exits the perforated membrane, or it may be flowed at a rate that allows for the flow to be broken at a desired size of the particles as the flow exits the perforated membrane. In embodiments, the slurry flow rate may be sufficiently slow that an amount of the slurry is able to separate from the slurry flow, after it has passed through an orifice, as a result of its own weight, similar to a drop of water separating from a water flow out of a tap. Depending on the viscosity of the slurry, a flow speed sufficient for this embodiment may be, for example, from 0.01 to 0.5 m/s for an alumina slurry having a solids content of 75% by weight and an orifice size of 0.37 mm in diameter. If higher flowing speeds are used, a sufficient height ensures that the slurry body detaches and attains the desired shape before entering the coagulation solution.

In embodiments where the perforated membrane is located above the coagulation solution, physical means may be used to separate the slurry into separate particle sized slurry bodies after it has passed through the perforated membrane. For example, vibration energy may be applied to the perforated membrane to separate a particle sized slurry body from the slurry flow. Application of the vibration may be controlled such that it is applied at regular intervals based on the flow rate of the slurry in order to sever the slurry flow at the desired points such that separate particle sized bodies are formed. In this embodiment, the vibration energy is at a combination of sufficient frequency and amplitude to separate the slurry bodies from the slurry flow. A range of frequencies in this embodiment may be from, for example, 10-1,000 Hz for an alumina slurry made up of 75% by weight of solids, an orifice size of 0.37 mm in diameter, a flowing speed of 1 m/s and a falling height 4 cm. The vibration amplitude may be adjusted accordingly to achieve a desired particle size and shape. The vibration action thus reduces the size of the slurry body. The vibration energy can be applied in any direction, for example perpendicular or parallel to the axis of the orifice.

The stabilized particles are collected from the coagulation solution by any suitable methodology. The collected stabilized particles are then dried using any suitable drying processes. If desired where the stabilized particles are of a continuous form, the stabilized particles may be subjected to size reduction, for example by cutting or applying vibration to the stabilized particles, in order to reduce the size of the particles to a desired end size. The end stabilized may then be subjected to air drying, or to drying using electric or gas driers. The stabilized particles may also be subjected to sintering, either during and/or as the drying step or as a separate step following drying. Sintering may be conducted at a temperature of from, for example, about 800° C. to about 2,300° C., such as from about 1,200° C. to about 1,700° C.

The coagulation solution comprises a coagulant that interacts with the reactant in the slurry to at least partially coagulate, gel and/or cross-link the reactant, thereby forming the slurry into a solid or semi-solid product, referred to herein as a "stabilized particle." Thus, when the slurry comes into contact with the coagulation liquid, the coagulation liquid interacts with the reactant in the slurry to stabilize the shape imparted to the slurry by passing through the perforated membrane. The slurry described herein is rather flowable, and the particle shape is stabilized by chemical reaction at least on the surface of the shaped slurry. Some examples of useful coagulation liquids, for example for use with sodium alginate as a reactant, include, but are not limited to, a calcium salt such as calcium chloride solution at suitable concentration of calcium chloride, or an aluminum chloride hexahydrate solution. The amount of coagulant to include in the solution should desirably be sufficient at a minimum to coagulate, gel and/or cross-link the reactant and at a maximum should desirably not exceed the concentration that will dissolve into the solution. For example, a suitable concentration of the coagulant in the coagulation solution may be, for example, 0.1% to 25%, such as 0.1% to 10% by weight of the coagulation solution.

The end shaped particles may have an average size (based on a largest diameter) of from 0.1 mm to 1 cm, for example from 0.1 mm to 5 mm or from 0.1 mm to 1 mm. The particles also have a narrow particle size distribution, for example a particle size distribution exhibiting differences between Dv10 and Dv90 values that are less than 20%. For non-spherical particle, the particles may have an average length of 0.1 mm to 5 cm, an average diameter (or cross-sectional width) of 0.1 mm to 1 cm, and an average length to diameter of at least 2:1.

In embodiments, a concentration of the particles in the treatment fluid may be any desired value, such as a concentration in the range of from about 0.01 to about 80% by weight of the treatment fluid, or a concentration in the range of from about 0.1 to about 25% by weight of the treatment fluid, or a concentration in the range of from about 1 to about 10% by weight of the treatment fluid.

The treatment fluid includes a carrier solvent that may be a pure solvent or a mixture. Suitable solvents may be aqueous or organic based. For example, the treatment fluid may include a carrier solvent and the rod-shaped particles. The fluid may be any suitable fluid, such as, for example, water, fresh water, produced water, seawater, or an aqueous solvent, such as brine, mixtures of water and water-soluble organic compounds and mixtures thereof. Other suitable examples of fluids include hydratable gels, such as guars, poly-saccharides, xanthan, hydroxy-ethyl-cellulose; cross-linked hydratable gels, viscosified acid, an emulsified acid (such as with an oil outer phase), an energized fluid (including, for example, an $N_2$ or $CO_2$ based foam), and an oil-based fluid including a gelled, foamed, or otherwise viscosified oil. Suitable organic solvents that may act as a carrier solvent for the treatment fluids of the disclosure include, for example, alcohols, glycols, esters, ketones, nitrites, amides, amines, cyclic ethers, glycol ethers, acetone, acetonitrile, 1-butanol, 2-butanol, 2-butanone, t-butyl alcohol, cyclohexane, diethyl ether, diethylene glycol, diethylene glycol dimethyl ether, 1,2-dimethoxyethane (DME), dimethylether, dibutylether, dimethyl sulfoxide (DMSO), dioxane, ethanol, ethyl acetate, ethylene glycol, glycerin, heptanes, hexamethylphosphorous triamide (HMPT), hexane, methanol, methyl t-butyl ether (MTBE), N-methyl-2-pyrrolidinone (NMP), nitromethane, pentane, petroleum ether (ligroine), 1-propanol, 2-propanol, pyridine, tetrahydrofuran (THF), toluene, triethyl amine, o-xylene, m-xylene, p-xylene, ethylene glycol monobutyl ether, polyglycol ethers, pyrrolidones, N-(alkyl or cycloalkyl)-2-pyrrolidones, N-alkyl piperidones, N, N-dialkyl alkanolamides, N,N,N',N'-tetra alkyl ureas, dialkylsulfoxides, pyridines, hexaalkylphosphoric triamides, 1,3-dimethyl-2-imidazolidinone, nitroalkanes, nitro-compounds of aromatic hydrocarbons, sulfolanes, butyrolactones, alkylene carbonates, alkyl carbonates, N-(alkyl or cycloalkyl)-2-pyrrolidones, pyridine and alkylpyridines, diethylether, dimethoxyethane, methyl formate, ethyl formate, methyl propionate, acetonitrile, benzonitrile, dimethylformamide, N-methylpyrrolidone, ethylene carbonate, dimethyl carbonate, propylene carbonate, diethyl carbonate, ethylmethyl carbonate, dibutyl carbonate, lactones, nitromethane, nitrobenzene sulfones, tetrahydrofuran, dioxane, dioxolane, methyltetrahydrofuran, dimethylsulfone, tetramethylene sulfone, diesel oil, kerosene, paraffinic oil, crude oil, liquefied petroleum gas (LPG), mineral oil, biodiesel, vegetable oil, animal oil, aromatic petroleum cuts, terpenes, mixtures thereof.

Treatment fluids may optionally comprise other chemically different materials. In embodiments, the treatment fluid may further comprise stabilizing agents, surfactants, diverting agents, or other additives. Additionally, a treatment fluid may comprise a mixture of various crosslinking agents, and/or other additives, such as fibers or fillers. Furthermore, the treatment fluid may comprise buffers, pH control agents, and various other additives added to promote the stability or the functionality of the treatment fluid. The components of the treatment fluid may be selected such that they may or may not react with the subterranean formation that is to be treated.

In some embodiments, the treatment fluid may further have a viscosifying agent. The viscosifying agent may be any crosslinked polymers. The polymer viscosifier can be a metal-crosslinked polymer. Suitable polymers for making the metal-crosslinked polymer viscosifiers include, for example, polysaccharides such as substituted galactomannans, such as guar gums, high-molecular weight polysaccharides composed of mannose and galactose sugars, or guar derivatives such as hydroxypropyl guar (HPG), carboxymethylhydroxypropyl guar (CMHPG) and carboxymethyl guar (CMG), hydrophobically modified guars, guar-containing compounds, and synthetic polymers. Crosslinking agents based on boron, titanium, zirconium or aluminum complexes are typically used to increase the effective molecular weight of the polymer and make them better suited for use in high-temperature wells.

Other suitable classes of polymers that may be used as a viscosifying agent include polyvinyl polymers, polymethacrylamides, cellulose ethers, lignosulfonates, and ammonium, alkali metal, and alkaline earth salts thereof. Additional examples of other water soluble polymers that may be used as a viscosifying agent include acrylic acid-acrylamide copolymers, acrylic acid-methacrylamide copolymers, polyacrylamides, partially hydrolyzed polyacrylamides, partially hydrolyzed polymethacrylamides, polyvinyl alcohol, polyalkyleneoxides, other galactomannans, heteropolysaccharides obtained by the fermentation of starch-derived sugar and ammonium and alkali metal salts thereof.

In some embodiments, the carrier fluid may optionally further comprise additional additives, including, for example, acids, fluid loss control additives, gas, corrosion inhibitors, scale inhibitors, catalysts, clay control agents, biocides, friction reducers, combinations thereof and the like. For example, in some embodiments, it may be desired to foam the composition using a gas, such as air, nitrogen, or carbon dioxide.

The foregoing is further illustrated by reference to the following examples, which are presented for purposes of illustration and are not intended to limit the scope of the present disclosure.

Although the preceding description has been set forth with reference to particular means, materials and embodiments, it is not intended to be limited to the particulars disclosed herein; rather, it extends to all functionally equivalent structures, methods and uses, such as are within the scope of the appended claims. Furthermore, although only a few example embodiments have been described in detail above, those skilled in the art will readily appreciate that many modifications are possible in the example embodiments without materially departing from the disclosure herein. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures.

What is claimed is:

1. A method for forming a perforated membrane comprising:
    providing a mold having at least a first set of a plurality of rods extending to at least a first height from a base of the mold;
    introducing a curable material into the mold in an amount such that a height of the curable material from the base of the mold is less than or equal to the first height so that the first set of the plurality of rods are within the curable material and extend to or past the height of the curable material in the mold;
    curing the curable material;
    dissolving the first set of the plurality of rods to thereby form perforations in the cured material;
    reintroducing a second set of plurality of rods into the perforations in the cured material, thereafter coating a surface of the cured material with a hydrophobic material, and thereafter removing the reintroduced the second set of plurality of rods from the cured material; and
    removing the cured material having the perforations from the mold.

2. The method according to claim 1, wherein providing the mold comprises providing a substrate having at least the first set of the plurality of rods extending from a surface of the substrate, and forming a membrane-shaping mold on the surface of the substrate, a bottom surface of the membrane-shaping mold providing the base of the mold.

3. The method according to claim 2, wherein the membrane-shaping mold is comprised of a silicone material.

4. The method according to claim 1, wherein providing the mold further comprises including a second set of two or more rods that extend to at least the first height from a base of the mold.

5. The method according to claim 1, wherein the curable material comprises a polyurethane, epoxy or polytetrafluoroethylene.

6. The method according to claim 1, wherein the first set of the plurality of rods are comprised of a metal, and the dissolving comprises exposing the metal to one or more acids that do not dissolve the cured material.

7. The method according to claim 1, wherein each rod of the first set of the plurality of rods imparts a perforation shape to the cured material that comprises a first opening having a first diameter on one side of the cured material that is greater than a second diameter of a second opening on an opposite side of the cured material, the first opening diameter tapering to the second opening diameter, and the second opening diameter having a depth into the cured material that is 1% to 30% of a total height of the cured material.

8. The method according to claim 1, wherein the method further comprises drilling on one side of the cured material, at each location corresponding to a location of the perforations in the cured material, to form a wider diameter opening than a diameter of the perforations, the wider diameter extending a depth into the cured material that is 50% to 99% of a total height of the cured material, and the wider diameter tapering to the diameter of the perforations.

9. A method comprising:
    forming a perforated membrane by:
        providing a mold having at least a first set of a plurality of rods extending to at least a first height from a base of the mold;
        introducing a curable material into the mold in an amount such that a height of the curable material from the base of the mold is less than or equal to the first height so that the first set of the plurality of rods are within the curable material and extend to or past the height of the curable material in the mold;
        curing the curable material;
        dissolving the first set of the plurality of rods to thereby form perforations in the cured material;
        reintroducing a second set of plurality of rods into the perforations in the cured material, thereafter coating a surface of the cured material with a hydrophobic material, and thereafter removing the reintroduced the second set of plurality of rods from the cured material; and
        removing the cured material having the perforations from the mold;
    inserting the formed perforated membrane into proppant manufacturing apparatus comprising a housing for a slurry comprised of particles and reactant, a mechanism for inducing flow of the slurry from the housing to a forming section that comprises the perforated membrane, and a container for providing a coagulation solution.

10. The method according to claim 9, wherein the method further comprises, prior to the dissolving of the first set of the plurality of rods, coating a surface of the cured material with a hydrophobic material.

11. The method according to claim 9, wherein each rod of the first set of the plurality of rods imparts a perforation shape to the cured material that comprises a first opening having a first diameter on one side of the cured material that is greater than a second diameter of a second opening on an opposite side of the cured material, the first opening diameter tapering to the second opening diameter, and the second opening diameter having a depth into the cured material that is 1% to 70% of a total height of the cured material.

12. The method according to claim 9, wherein the method further comprises drilling on one side of the cured material, at each location corresponding to a location of the perforations in the cured material, to form a wider diameter opening than a diameter of the perforations, the wider diameter extending a depth into the cured material that is 5% to 70% of a total height of the cured material, and the wider diameter tapering to the diameter of the perforations.

13. The method according to claim 9, further comprising inducing the flow of the slurry through the perforated membrane and into the coagulation solution.

14. The method according to claim 9, wherein the proppant manufacturing apparatus is a drop tower device.

15. The method according to claim 9, wherein in the proppant manufacturing apparatus, the perforated membrane is located above the coagulation solution.

16. The method according to claim 9, wherein in the proppant manufacturing apparatus, the perforated membrane is immersed in the coagulation solution.

* * * * *